Oct. 13, 1964  W. M. OSBORN  3,152,854
BATTERY CABLE CONNECTOR
Filed May 13, 1963
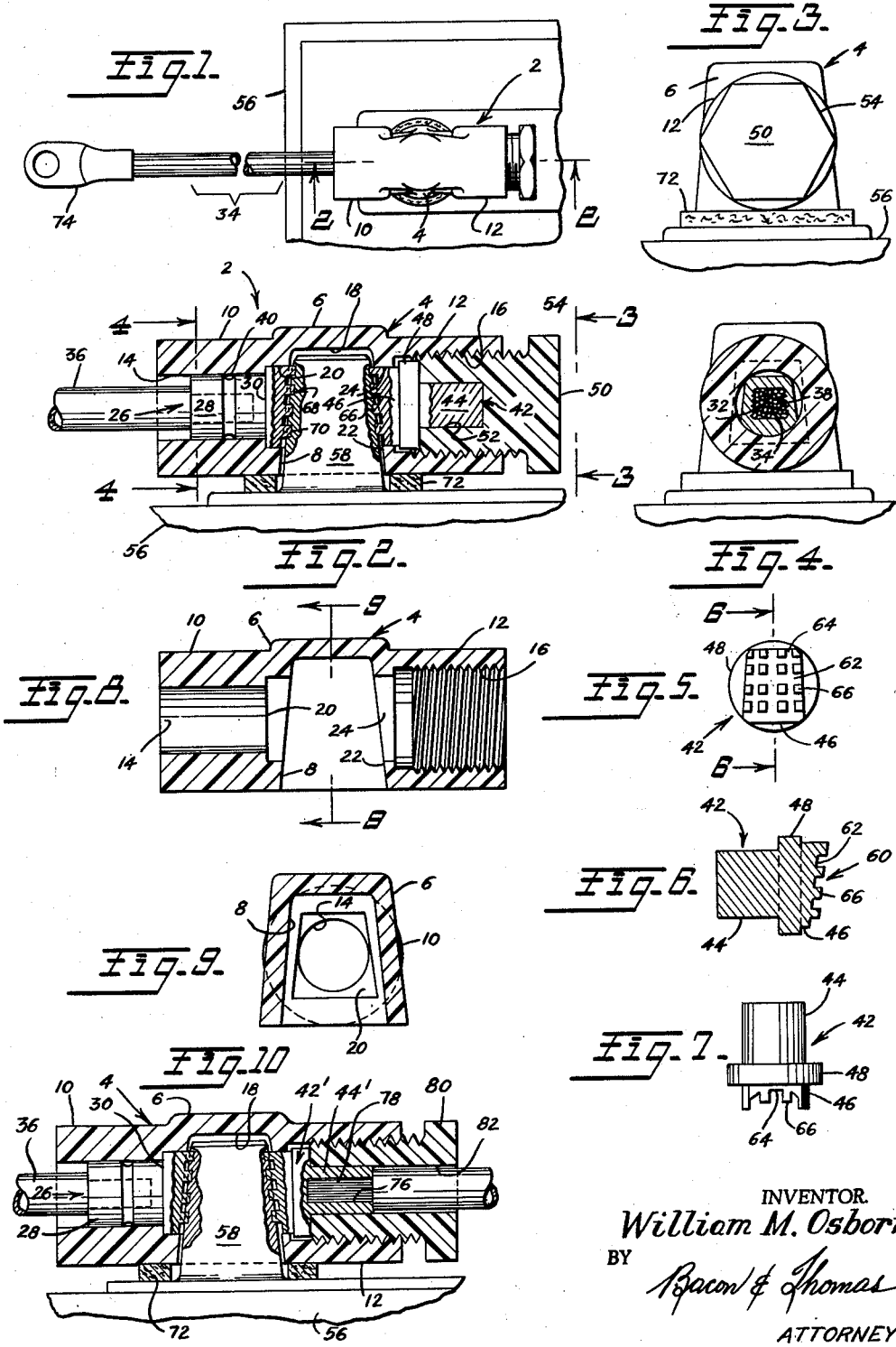
INVENTOR.
William M. Osborn
BY
Bacon & Thomas
ATTORNEYS

United States Patent Office 3,152,854
Patented Oct. 13, 1964

3,152,854
BATTERY CABLE CONNECTOR
William M. Osborn, 3349 Zuni St., Denver, Colo.
Filed May 13, 1963, Ser. No. 280,004
17 Claims. (Cl. 339—237)

This invention relates generally to an electric terminal connector, and more particularly to a corrosion-preventing terminal connector for connecting the end of either one or two cables to the same terminal post of an electric storage battery.

It is well known that connecting elements secured to the ends of battery cables and attached to terminals of a lead plate storage battery are subject to the corrosive action of gases which discharge from the cells of the battery. The corrosive action is often severe enough to cause objectionable deposits on the connecting elements, and to eat away a portion thereof. The damage caused by such corrosion can be sufficient to cause a breakdown in the electrical connection between the connected elements, and in many instances makes removal of the cables from the battery a difficult task.

The battery cable connector of the present invention comprises a non-corrodible housing designed to shield the gripper portions of one or more battery cables and a battery terminal post from corrosion-causing gases emanating from the battery, whereby the housing functions to substantially prevent corrosion of the electrical connecting elements.

Battery cable connectors are commonly employed in automobiles and the like, where relatively continuous vibrations and occasional mechanical shocks are present. These vibrations and shocks have been known to cause a cable connector to loosen, whereby the electrical contact between a battery cable and its associated terminal post has been broken. The connector of this invention employs a unique clamping arrangement comprising a pair of grippers, which securely clamp one end of one or two cables to the terminal of a battery at diametrically opposite sides thereof and which when properly installed, will not be displaced by vibrations, shocks and the like.

The capability of the present cable connector to remain securely in its properly installed position because of the clamping forces on opposite sides of the battery terminal (which forces are always present whether one or two cables are connected to the terminal) also contributes significantly to the corrosion-preventing features thereof. The instant connector contains a transverse bore within which a battery terminal is received, said bore being closed at one end. The battery cables to be connected to the terminal make electrical contact therewith within said transverse bore, and a sealing washer is placed about the entrance to said bore between the connector and the battery. Thus, when the connector has been properly installed, the transverse bore is sealed against the entrance of corrosive gases, and such gases are thereby prevented from reaching the engaged, electrical contact-establishing surfaces within said bore.

For so long as the transverse bore is sealed against the entry of corrosive gases, the possibility of the engaged contact surfaces becoming corroded is minimized. The stability of the instant connector insures that the sealing washer will remain in its proper sealing position, and thus reduces to a minimum the possibility of the seal created thereby being broken. Thus, the unique clamping arrangement of the invention maintains the integrity of the seal preventing entry of corrosive gases into the transverse bore, and thereby minimizes the possibility of corrosion.

The connector of the invention incorporates a housing constructed of nonconducting material, and which has a pair of longitudinally aligned bores therein. A tapered bore extends transversely of the housing between said aligned bores, and is adapted to receive the terminal post of a battery; as indicated above. Disposed within one of the two aligned bores is a first gripper element having means thereon to secure one end of a conductor thereto, and disposed within the other of the two aligned bores is a second gripper element.

The bore within which the second gripper element is received is threaded for the reception of a sleeve member, which sleeve member functions to urge the second gripper element toward the first gripper element to thereby engage and clamp a terminal post positioned within the transverse bore in the housing. The housing and the gripper elements have noncircular engaging surfaces therebetween, which insure that said grippers will be properly and nonrotatably positioned to securely grasp the terminal post. As has been mentioned hereinabove, a sealing washer is disposed between the housing and the top of the battery from which the terminal post projects, and functions to seal the terminal post-receiving bore against the entry of corrosive gases.

In certain instances, it is desirable to connect two conductors, or cables, to a single battery terminal post. The cable connector of the invention is adaptable to such purpose, the same being accomplished by merely connecting the second cable to the second gripper element. Thus, the present connector is readily adaptable to connect either one or two cables to a single terminal post, and is constructed to remain fixed in a predetermined position to insure the integrity of a seal established against corrosive gases and to maintain firm electrical contact between the engaged conductive elements.

It is, therefore, an object of this invention to provide a battery terminal connector which will hermetically seal the engaged surfaces between a contact and a battery terminal post against damage from corrosive gases.

It is also an object to provide a terminal connector which may be used alternatively to connect either one or two cables to a battery terminal post.

A further object is to provide a battery terminal connector constructed to securely engage a terminal post and to resist accidental displacement therefrom.

Another object is to provide a battery terminal connector constructed to be substantially immovable in any direction when properly installed on a terminal post.

A further object is to provide a battery terminal connector constructed to insure correct assembly of its component parts.

It is also an object to provide a battery terminal connector that can be easily and economically fabricated, and which can be easily installed and removed.

Other objects and many of the attendant advantages of this invention will be readily appreciated by reference to the following detailed description when considered in connection with the accompanying drawings, wherein:

FIG. 1 is a fragmentary plan view of a battery having a terminal connector of the invention mounted upon one terminal post thereof and connecting a single cable thereto;

FIG. 2 is an enlarged fragmentary, vertical sectional view through the terminal connector, taken on the line 2—2 of FIG. 1, particularly showing the gripper elements that engage the opposite sides of the terminal post;

FIG. 3 is a vertical sectional view thereof as seen on the line 3—3 of FIG. 2;

FIG. 4 is a vertical sectional view, taken on the line 4—4 of FIG. 2;

FIG. 5 is an end elevational view of one of the gripper elements of the present invention;

FIG. 6 is a vertical sectional view, taken on the line 6—6 of FIG. 5;

FIG. 7 is a plan view of the gripper element of FIG.

5, showing in particular the configuration of the clamping teeth thereon;

FIG. 8 is a longitudinal, vertical sectional view of the connector housing;

FIG. 9 is a transverse, vertical sectional view, taken on the line 9—9 of FIG. 8; and FIG. 10 is a vertical sectional view of a modified form of terminal connector including a modified gripper element and a modified connector sleeve for connecting a second cable to the terminal post.

Referring now to the drawings, the battery terminal connector of the invention is indicated generally at 2, and includes a housing 4. The housing 4 is constructed of a suitable electrically nonconducting material, such as hard rubber or preferably a transparent plastic material, such as, for example, polymerized methylmethacrylate (more commonly known as "Lucite"). In fact, any suitable head and acid-resisting plastic material may be used for the housing, including colored plastic materials. The housing 4 includes a central frusto-conical portion 6 and a pair of longitudinally aligned cylindrical portions 10 and 12, said frusto-conical portion extending transversely of and being positioned between said cylindrical portions. The portions 10 and 12 have cylindrical bores 14 and 16, respectively, extending therethrough, the bore 16 being threaded and having a larger diameter than the bore 14. The housing portion 6 has a frusto-conical bore 8 therein, which extends transversely to the bores 14 and 16, said bore 8 being closed at its inner, or top, end.

The two cylindrical bores 14 and 16 are aligned, and lie concentrically about the same longitudinal central axis. The central axis of the frusto-conical bore 8 intersects the longitudinal axis of said aligned bores 14 and 16 and preferably extends normal thereto. Further, the bore 8 has a depth sufficient so that the inner end face 18 thereof lies above the bore 16, whereby the bores 14 and 16 are in communication therewith.

The side wall of the bore 8 has a recess 20 therein extending about the inner end of the bore 14, said recess having a noncircular configuration. The noncircular configuration of the recess 20 may assume any of several shapes. However, as is best shown in FIG. 9, it has been found that the shape of a truncated triangle is suitable for most applications.

A partition or wall 22 separates the threaded bore 16 from the bore 8, said partition having a noncircular opening 24 therein disposed to confront the recess 20. The opening 24 preferably has a configuration corresponding to that of the recess 20, and must have an area at least as great as the cross sectional area of said recess. While the opening 24 may assume a noncircular shape other than that of the recess 20, the cross-sectional area thereof should be sufficiently great so that the configuration of the recess 20 may be completely superimposed thereon and lie within the boundary. The reason of this relationship will be discussed in greater detail hereinbelow.

Disposed within the bore 14 is a gripper element 26, said gripper element including a body portion 28 and an enlarged head portion 30. The body portion 28 has an initially cylindrical bore 32 therein, within which bore the end of an electrical conductor or cable 34 having insulation 36 thereon is secured in the following manner.

A portion of the insulation 36 at the forward end of the conductor 34 is first removed, and the conductor end is inserted into the bore 32. The body portion 28 is then deformed inwardly, whereby it assumes a cross-sectional configuration similar to that shown in FIG. 4. Such deformation securely clamps the body portion of the gripper element to the exposed end of the conductor or cable, whereby they are in effect made into one unit. The wall defining the bore 32 is provided with teeth 38 (FIG. 4) to further insure that the two elements will remain coupled, and an external groove 40 is formed into the body portion 28 after the conductor end is placed therewithin to further lock the two together. The gripper 26 is constructed of a conductive material, whereby electrical contact can be establsihed between the conductor 34 and a terminal post.

The head portion 30 of the gripper 26 has a cross-sectional configuration identical to that of the recess 20, and is receivable therein.

Disposed within the threaded bore 16 and extending through the opening 24 is a second gripper element 42, said element including a body portion 44, a head portion 46, and a collar 48 positioned at the forward end of said body portion. The collar 48 has a circular configuration of a diameter slightly less than the minimum diameter of the threaded bore 16. The head portion 46 of the gripper 42 has a cross-sectional configuration corresponding to that of the noncircular opening 24, and is receivable therewithin.

An externally threaded sleeve 50 is receivable within the threaded bore 16, and has a bore 52 in the front face thereof for receiving the cylindrical body 44 of the gripper 42. The sleeve 50 is preferably constructed from the same material as the housing 4, and has at its outer end a hexagonal-shaped flange 54 to facilitate turning thereof.

The cable connector of the invention is primarily intended for use on an automobile battery, such a battery being indicated at 56 and having a frusto-conical terminal post 58 projecting upwardly therefrom. It is to be understood that a battery may include two or more such terminal posts, and that the connector of the invention may be attached to any one thereof. The terminal post 58 is receivable within the bore 8, the frusto-conical shape of said bore corresponding generally to that of the terminal post, the diameter of said bore being slightly larger than that of said post.

The front face 60 of the gripper 42 is shaped to correspond generally to the frusto-conical shape of the post 58, as is best shown in FIGS. 6 and 7. More specifically, said front face 60 is tapered in vertical profile, and is rounded in the horizontal profile, whereby it will complementarily engage against the frusto-conical surface of said terminal post. The face 60 has a plurality of vertical and horizontal grooves 62 and 64 therein, which grooves define rectangular teeth 66. As is best shown in FIGS. 6 and 7, the teeth 66 project from the face of the gripper parallel with the longitudinal axis thereof. The teeth 66 preferably all project a uniform distance of about 3/32 of an inch, and the front faces thereof lie in planes which extend transversely perpendicularly to the longitudinal axis of the gripper, and which extend vertically at an angle to said longitudinal axis corresponding to the angle of the taper of bore 8. Thus said teeth define biting edges which will engage and bite into the terminal post 58.

The front face 68 of the gripper 26 also has vertical and horizontal grooves therein, which grooves define teeth 70 which are identical in shape to the teeth 66.

The cable connector of the invention is assembled in the following manner. Initially, the insulation is stripped from the end of the conductor 34, and said end is then passed through the bore 14, across the bore 8, and through the threaded bore 16, to extend beyond the housing 4. The gripper 26 is then secured to the exposed end of the conductor, after which said conductor, with its attached gripper, is pulled back through the threaded bore 16, the bore 8, and into the bore 14. It is evident that to allow for such manipulation the diameter of the bore 16 must be sufficiently great to permit passage of the gripper head portion 30 therethrough, and the opening 24 must also have a cross-sectional area sufficiently large to permit the passage of said head portion 30 therethrough.

The gripper head portion 30 is then seated within the recess 20, the noncircular configuration of said recess and said head functioning to insure that the head will be properly and nonrotatably positioned so that the teeth 70 will correctly engage with a terminal post. The truncated triangle configuration of the recess 20 and the head 30 insures that the teeth 70 will be properly positioned, but as has been stated hereinabove other configurations may be utilized with like effect.

After the conductor 34 and its attached gripper 26 have been positioned within the housing 4, the gripper element 42 is placed in position. Again, the noncircular mating surfaces between the head portion of said gripper and the wall defining the opening 24 function to insure that the teeth 66 will be properly positioned to engage a terminal post. The collar 48 functions to prevent the gripper element from extending too far into the bore 8, and also serves as a continuous surface against which the front face of the sleeve 50 may engage. After the gripper 42 has been installed, the sleeve 50 is threaded into the bore 16, and the connector is then ready for installation on the terminal post of a battery.

Before installing the connector 2 in position on the terminal post 58, a sealing washer 72, which may be constructed from rubber, is placed over said post and rests on the top surface of the battery 56. The connector 2 is then placed on the terminal post 58, with said terminal post being received in the frusto-conical bore 8. The sleeve 50 is then threaded inwardly to urge the gripper 42 toward the gripper 26, whereby the opposing teeth 66 and 70 are caused to engage and bite into the surface of the terminal post on diametrically opposite sides thereof. It is thus seen that the sleeve 50 may be tightened until the housing 4 is securely attached to the terminal post.

Because the terminal post is gripped on diametrically opposite sides between two teeth-bearing gripper elements, the possibility of the connector becoming inadvertently displaced is at a minimum. Even in the presence of severe vibrations, the teeth 66 and 70 will hold the housing 4 in position and will restrain it from movement in any direction. Thus, the seal formed by the resilient washer 72 will be static, and the possibility of corrosive gases emanating from the battery leaking thereby will be at a minimum.

It should be noted that the head portion 30 engages sufficiently tightly with the bottom of the recess 20 to substantially prevent the passage of gases therebetween, and that the engagement between the front face of the sleeve 50 and the rear face of the collar 48 is sufficiently tight to prevent entry of gases into the bore 8 through this channel. Thus, the engaged surfaces between the two gripper elements and the terminal post are hermetically sealed, and will remain free from corrosion for so long as the housing 4 and the washer 72 are properly positioned.

The conductor 34 has a conventional connector 74 on its end opposite the connector 2, which connector functions to permit connection of the battery cable, or conductor, to another terminal spaced from the battery. It is evident that the connector 2, grippers 26 and 42 and the sleeve 50 may be sold alone commercially, in which instance the gripper 26 is merely installed on an available conductor in the manner hereinabove described. Similarly, the connector of the invention may also be sold with a suitable conductor 34 already mounted therewithin, in which case the gripper 26 may be installed on the conductor end at the factory.

The connector embodiment of FIGS. 1–9 functions to securely connect one end of a single conductor to the terminal post of a battery, and protects the engaged conductor surfaces against corrosion. In some instances, it is desirable to connect two conductors to a single terminal post, and a modification of the present invention for effecting such a connection is illustrated in FIG. 10.

Referring to FIG. 10, a gripper 42' is illustrated, which is identical in construction to the gripper 42, except that it has a bore 76 in the rear face thereof. Received within the bore 76 is one end of a conductor 78, said conductor being secured within said bore by deforming the body portion 44' of the gripper 42' radially inwardly, in a manner analogous to that described hereinabove for the gripper 26. Thus, the gripper 42' functions in a manner identical to the gripper 26 to place the conductor 78 in electrical contact with a battery terminal post.

In use, the gripper 42' is substituted in the housing 2 in place of the gripper 42, and a sleeve 80 is threaded into the bore 16 to urge the gripper 42' into contact with a terminal post. The sleeve 80 is substantially identical in construction to the sleeve 50, except that it has a cylindrical bore 82 extending completely therethrough for the reception of the conductor 78. As is evident from an examination of FIG. 10, the modification of the invention shown therein is assembled in the following manner.

A portion of the insulation covering the end of the conductor 78 is initially removed, and the sleeve 80 is then passed over said conductor end and is slid back a distance therefrom. The exposed end of the conductor 78 is then positioned within the bore in the gripper element 42', and the body 44' of said gripper is deformed radially inwardly. The sleeve 80 is then slid forward to lie over the body 44' of the gripper 42', and the sleeve is then threaded into the bore 16.

It is thus seen that a battery terminal connector has been provided which fulfills the objects set forth for the invention, and which can alternatively be used to connect either one or two conductors to the terminal post of a storage battery. While the invention has been described primarily with reference to a lead plate storage battery, it is to be understood that it is also suited for use in other applications. For example, it is especially suitable for making weatherproof connections with exposed terminals on a transformer box, and the like. It is also evident that it is not necessary that the bore 8 be disposed normally to the axis of the aligned bores 14 and 16, and that it may assume angles other than 90 degrees thereto.

Further, it is obvious that other changes may be made in the connector without departing from the scope of the invention. In particular, the configuration of the recess 20 and the opening 24 can be varied from the truncated triangle shape shown in the drawings, although it has been found that this shape is preferable for many applications to insure that the gripper elements will be properly positioned relative to the terminal post. In addition, the taper of the bore 8 and the faces of the gripper elements can be varied to correspond to the taper of different terminal posts, and in some instances such taper might be completely eliminated and said bore and the gripper faces be made cylindrical.

Obviously many modifications and variations of the present invention are possible in the light of the above teachings. It is therefore to be understood that, within the scope of the appended claims, the invention may be practiced otherwise than as specifically described.

I claim:

1. A battery terminal connector, comprising: a housing having a pair of longitudinally aligned bores and a transverse bore therein, said transverse bore being positioned between said aligned bores; a first gripper slidably receivable within one of said aligned bores and having an enlarged head extending into said transverse bore; a second gripper slidably receivable within the other of said aligned bores and having an enlarged head extending into said transverse bore, at least one of said grippers including means for connecting the end of a conductor thereto; and means in said other bore for urging said second gripper toward said first gripper to cause the enlarged head of said grippers to grip the opposite sides of a battery terminal when received within said transverse bore.

2. A battery terminal connector as recited in claim 1, wherein the head on the grippers is noncircular and cooperating means is provided on said housing engaged with the enlarged head of said grippers and arranged to prevent rotation of said grippers relative to said housing.

3. A battery terminal connector as recited in claim 1, wherein additionally, said transverse bore is closed at one end and tapers outwardly from said closed end, and wherein the confronting faces of said grippers are concavely tapered to correspond to said transverse bore and have axially projecting teeth thereon, said teeth being spaced from each other and being arranged in vertically and horizontally extending rows.

4. A battery terminal connector as recited in claim 3, wherein said teeth are rectangular, and wherein the front faces of all of the teeth on each gripper lie in mutually parallel planes.

5. A battery terminal connector, comprising: a housing having a pair of longitudinally aligned bores and a transverse bore therein, said transverse bore being positioned between said aligned bores; a first gripper receivable within one of said aligned bores and extending into said transverse bore; a second gripper receivable within the other of said aligned bores and extending into said transverse bore, both of said grippers including means for connecting the end of a conductor thereto; and means in said other bore for urging said second gripper toward said first gripper to grip the opposite sides of a battery terminal when received within said transverse bore.

6. A battery terminal connector as recited in claim 1, wherein said housing is constructed of an electrical insulative material, and said grippers are both constructed of a conductive material.

7. A battery terminal connector, comprising: a housing having a pair of longitudinally aligned bores and a transverse bore therein, said transverse bore being positioned between said aligned bores, and one of said aligned bores being threaded; a partition in said housing separating the threaded one of said aligned bores from said transverse bore, said partition having a noncircular opening extending therethrough, and said housing further including a noncircular recess in the wall defining said transverse bore, said recess being disposed to surround the inner end of the other aligned bore and to confront said noncircular opening; a first gripper receivable within said other aligned bore and having a head thereon, said head being receivable within and having substantially the same configuration as said recess and projecting into said transverse bore; a second gripper receivable within said threaded bore and having a head thereon, said head being slidably receivable within and having substantially the same configuration as said noncircular opening through said partition; means on at least one of said grippers for securing the end of an electrical conductor thereto; and a threaded sleeve in said threaded bore arranged so that when manipulated it will urge said second gripper toward said first gripper to thereby clamp a terminal post when received within said transverse bore.

8. A battery terminal connector as recited in claim 7, wherein additionally said transverse bore is closed at one end, and wherein the confronting faces of said gripper heads have teeth thereon.

9. A battery terminal connector as recited in claim 8, wherein said sleeve has a bore extending therethrough, and wherein both of said grippers include means securing one end of a conductor thereto, the conductor secured to said second gripper extending through said sleeve bore.

10. A battery terminal connector, comprising: a housing having a pair of longitudinally aligned bores and a transverse bore therein, said transverse bore being closed at one end and being positioned between said aligned bores, and one of said aligned bores being threaded; a partition in said housing separating the threaded one of said aligned bores from said transverse bore, said partition having a noncircular opening extending therethrough, said housing further including a noncircular recess in the wall defining said transverse bore, said recess being disposed to surround the inner end of the other aligned bore and to confront said noncircular opening; a first gripper, said first gripper including: a body portion receivable within said other aligned bore, means on said body portion for securing one end of a conductor thereto, and an enlarged head on the inner end of said body portion, said head being receivable within and having substantially the same configuration as said recess, and projecting into said transverse bore; a second gripper, said second gripper including: a body portion receivable within said threaded bore, and a head on the inner end of said body portion, said head being receivable for translational movement within and having substantially the same configuration as said noncircular partition opening; and a threaded sleeve in said threaded bore arranged so that when manipulated it will urge said second gripper toward said first gripper to thereby clamp a terminal post received within said transverse bore between the confronting faces of said first and said second gripper heads.

11. A battery terminal connector as recited in claim 10, wherein the confronting faces of said first and said second gripper heads have arcuate recesses therein extending generally parallel to the central axis of said transverse bore, and wherein each of said confronting faces has a plurality of spaced, parallel, substantially identical-in-length teeth thereon.

12. A battery terminal connector as recited in claim 11, wherein said transverse bore and both of said arcuate gripper head faces taper outwardly from the closed end of said bore.

13. A battery terminal connector as recited in claim 10, wherein the periphery of said noncircular opening is of a size and configuration to at least correspond to the size and configuration of the periphery of said recess, and wherein said threaded bore has a diameter at least equal to the largest cross dimension of said noncircular opening, whereby said first gripper can be passed through both said threaded bore and said noncircular opening.

14. A battery terminal connector as recited in claim 10, wherein said sleeve includes a bore in the inner end thereof of a size to receive the outer end of the body portion of said second gripper, and wherein said second gripper additionally includes: an enlarged collar, said collar being spaced from the outer end of the body portion of said second gripper and being engageable with the inner end face of said sleeve.

15. A battery terminal connector as recited in claim 14, wherein said bore in said sleeve extends completely therethrough, and including additionally: means on said second gripper for securing the end of a conductor thereto.

16. A battery terminal connector as recited in claim 15, wherein said housing and said sleeve are constructed from an electrical insulative material, and wherein said grippers are constructed from an electrically conductive material.

17. A battery terminal connector as recited in claim 10, including additionally: a resilient sealing washer adapted for mounting on said housing about the open end of said transverse bore.

References Cited in the file of this patent

UNITED STATES PATENTS

| | | |
|---|---|---|
| 1,684,588 | Jansky | Sept. 18, 1928 |
| 2,168,250 | Toiberg et al. | Aug. 1, 1939 |
| 2,255,862 | Sherrill | Sept. 16, 1941 |
| 2,906,988 | Stocking | Sept. 29, 1959 |
| 2,925,579 | Osborn | Feb. 16, 1960 |
| 3,005,182 | Janik | Oct. 17, 1961 |

FOREIGN PATENTS

| | | |
|---|---|---|
| 262,397 | Switzerland | Oct. 1, 1949 |